Dec. 11, 1928.
V. CHRISTENSEN
1,695,008
STERILIZING AND INCUBATING APPARATUS
Filed March 2, 1926   2 Sheets-Sheet 1
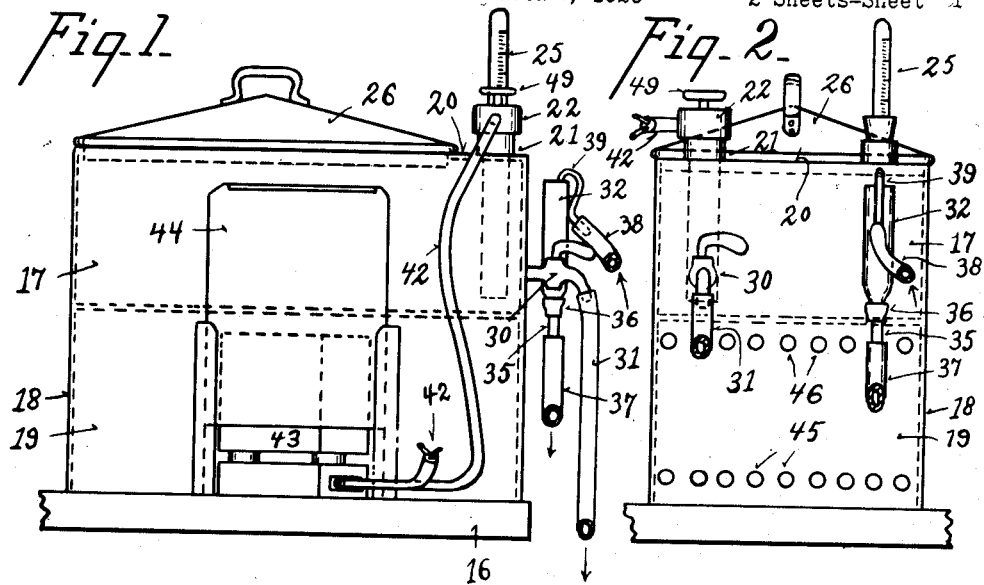
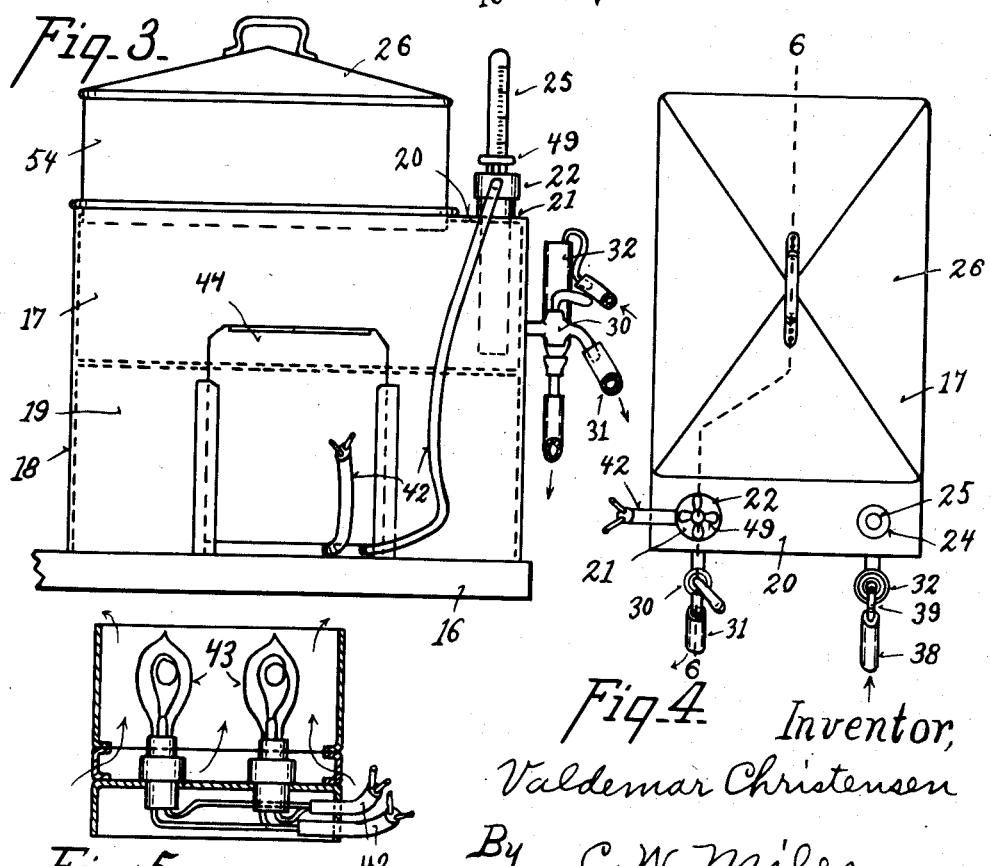
Inventor,
Valdemar Christensen
By C. W. Miles,
Attorney.

Dec. 11, 1928.
V. CHRISTENSEN
1,695,008
STERILIZING AND INCUBATING APPARATUS
Filed March 2, 1926    2 Sheets-Sheet 2
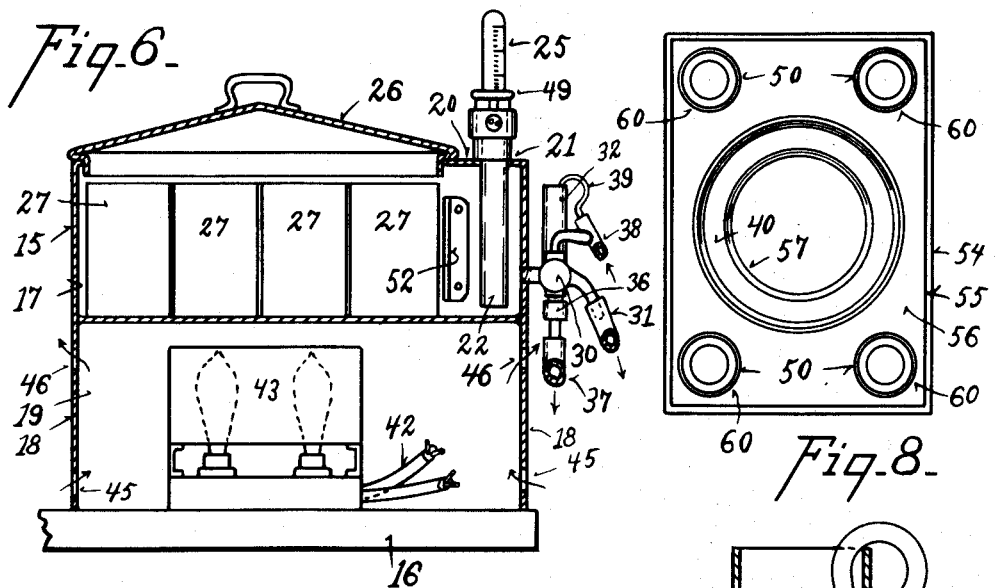
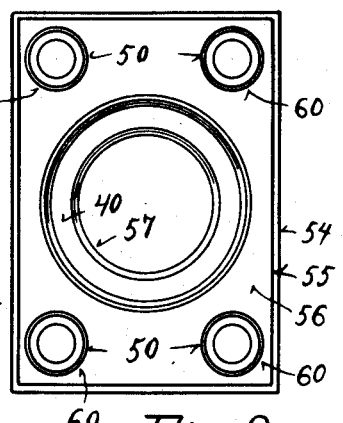
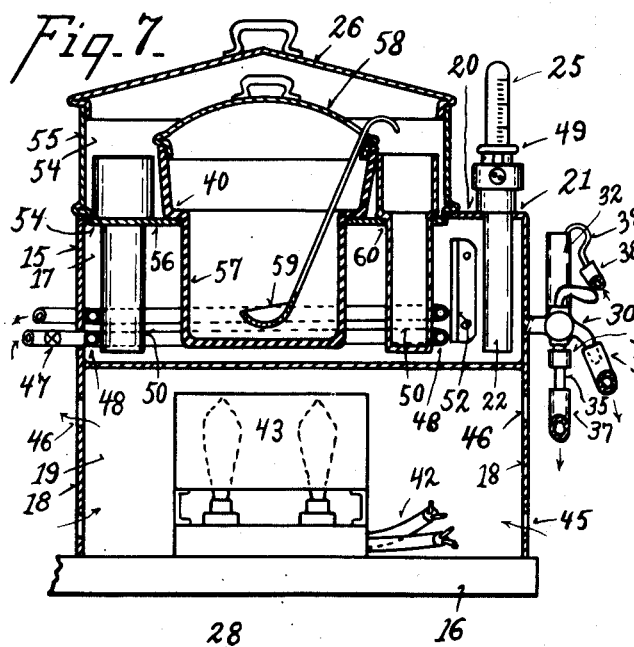
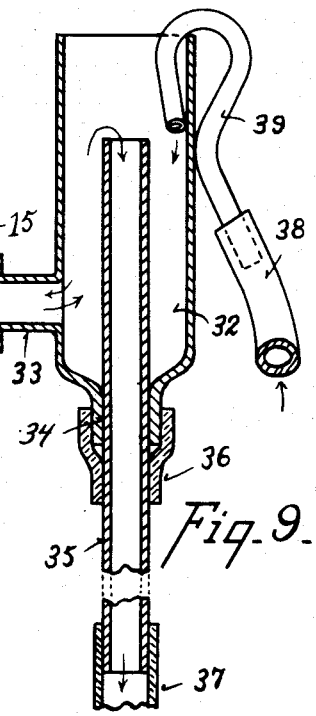
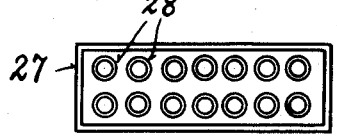
Inventor,
Valdemar Christensen
By C. W. Miles,
Attorney.

Patented Dec. 11, 1928.

1,695,008

UNITED STATES PATENT OFFICE.

VALDEMAR CHRISTENSEN, OF CINCINNATI, OHIO.

STERILIZING AND INCUBATING APPARATUS.

Application filed March 2, 1926. Serial No. 91,778.

My invention relates to improvements in sterilizing and incubating apparatus. One of its objects is to provide improved apparatus to bacteriologically and otherwise test milk and similar samples. Another object is to provide improved apparatus to incubate pure cultures of bacteria and similar organisms. Another object is to provide improved apparatus adapted to maintain the fluids in which such organisms are developing at uniform predetermined temperatures. Another object is to provide improved means whereby temperatures below normal room temperatures or room temperature may be provided and maintained as well as temperatures above normal atmospheric temperatures, as may be required from time to time or with the seasonal changes in the atmospheric temperature. Another object is to provide improved means whereby the apparatus is readily interchangeable to adapt it for testing a multiplicity of milk samples, or similar service, or for the incubation of pure bacteriological cultures. Another object is to provide improved means for sterilizing the containers employed in either testing samples or in incubating pure cultures. My invention also comprises certain details of form and arrangement, and combination of components, all of which will be fully set forth in the description of the accompanying drawings in which, Fig. 1 is a side elevation of my improved apparatus, adapted for milk testing.

Fig. 2 is a front elevation of the same.

Fig. 3 is a view similar to that shown in Fig. 1, adapted for the incubation of pure cultures.

Fig. 4 is a plan view of either Fig. 1 or 3.

Fig. 5 is a central vertical section through the heating element detached.

Fig. 6 is a vertical section through the apparatus of Figs. 1 and 4, taken upon line 6—6 of Fig. 4.

Fig. 7 is a vertical section through Figs. 2 and 4, taken upon line 6—6 of Fig. 4.

Fig. 8 is a plan of the superstructure of Fig. 7, detached, and with the lid thereof removed.

Fig. 9 is a sectional detail of the water supply and adjustable overflow control detached.

Fig. 10 is a plan of one of the detachable test tube racks employed in Figs. 1 and 6 for conducting milk and similar tests.

The accompanying drawings illustrate the preferred embodiment of my invention in which 15 represents a sheet metal structure adapted to be mounted upon a work bench 16. The structure 15 comprises a fluid tank or container 17 supported in an elevated position above the bench 16 by downward extensions 18 of the side walls of the container 17. The extension walls 18 form or inclose a heater chamber 19 beneath the container 17. The container 17 is partly open at the top, providing an offset or ledge 20 across the front of the container which is perforated at 21 to detachably receive a thermostat of the pencil type 22, and is perforated at 24 to detachably receive a thermometer 25. A lid 26 serves to detachably close the opening at the top of the container 17.

The container 17 is designed to be nearly filled with water or other fluid to provide a fluid bath in which a series of test tube racks 27 containing each a series of test tubes 28 are adapted to be partly submerged for testing operations, and in which one or more incubating containers 57 are adapted to be interchangeable therewith, partly submerged for incubating operations. The container 17 is provided with an exit cock 30, located a short distance above the bottom of container 17 and adapted to draw off the major portion of the fluid contents of container 17, leaving a small body of fluid in the lower portion of container 17, which small body of fluid is designed to be heated to or above the boiling point of water when it is desired to heat and steam sterilize the interior of container 17, together with the test tubes or incubating vessels mounted within the container 17, whenever such sterilizing operation may become necessary. A flexible tube 31 serves to lead the fluid from the cock 30 to a sink or drain.

In order that the upper fluid level within the container 17 may be regulated to different heights, and may be automatically maintained, a vertical tube or well 32 is attached to the front of the container 17 by means of a short lateral conduit 33 which is threaded or soldered to the front wall of the container, see Fig. 9. The well 32 is open at the top, and has a restricted opening 34 at its lower end through which is introduced and vertically adjusted an overflow tube 35. A short section of flexible rubber tubing 36 serves to seal the joint between the overflow tube 35 and the lower end 34 of the well 32 and to render said joint fluid leak-proof, and at the same time to permit the tube 35 to be vertically adjusted within the well 32 so as to variably adjust the overflow level of the fluid within the container 17. A flexible hose 37 connected to the lower end of the overflow tube 35 conducts any overflow from container 17 to a sink or drain. A flexible hose 38 leading from a city water supply cock or other source of water or fluid supply is provided with a metal nozzle 39 which has its end hooked over the upper edge or rim of the well 32, and is thereby adapted to periodically feed water to fill or refill the container 17, or to continuously feed a small stream of water or cooled water to the well 32 and container 17, while the excess therefrom overflows the rim at the upper end of the tube 35, and escapes down the tube 35.

When employed for testing milk samples, and similar purposes, the milk to be tested is placed in test tubes 28, which have been previously sterilized. The test tubes 28, after the milk samples have been introduced, have their open ends closed, preferably by means of plugs of cotton wool, or metal caps or thimbles of aluminum or other non-corrosive metal inverted over the open ends of the test tubes. The test tubes are then placed side by side in metal test tube racks 27, two or more of which racks are placed side by side in the container 17, so that the test tubes are half to two thirds submerged in the fluid contents of the container 17. The thermostat 21 opens and closes an electric circuit 42, in which circuit the incandescent light bulbs or other electrical heating element 43 are included, and said electrical heating element 43 is introduced through a door 44 in the side wall 18 into the compartment 19 below the container 17. Perforations 45 near the bottom of the walls 18, admit cool air to the chamber 19 and heating element 43, and perforations 46 near the top of the walls 18 permit heated air to escape from the chamber 19. The thermostat 21 and heater 43 thereby serve to heat the fluid contents of the container 17 to a pre-determined temperature above the normal atmospheric or room temperature, and by automatically opening and closing said circuit to maintain a uniform temperature within container 17 independently of changes in the room temperature. Vertical ledges 52 serve to hold the test tube racks out of contact with the thermostat 21 and thermometer 25.

It sometimes happens that the temperature required in the container 17 is one which is lower than the normal or room temperature, in which event a refrigerating coil 48 located within the container 17 may have a regulated flow of either fresh water, or of artificially refrigerated brine controlled by a cock 47 circulated therethrough tending to hold the temperature in container 17 slightly below the temperature desired therein, while the thermostat 21 is adjusted by means of a key 49 to automatically and intermittently close heater circuit to counteract or compensate for any excess of refrigerating effect, and to thereby regulate and hold the temperature in container 17 uniformly at a pre-determined temperature lower than that of the room temperature. Where a refrigerating coil and refrigerating medium to circulate therein are not available I employ in place thereof one or more small and deep containers 50, in which cracked ice is placed, and said containers 50 are partly immersed in the fluid in container 17, or a small stream of cooled water is fed continuously to the container 17.

Where it is desired to incubate pure bacteriological cultures, as for instance to propagate pure cultures with which to carry out commercial operations, I provide a superstructure 54 to be seated over the opening in the container 17, and with side walls 55 extending above the container 17, as shown in Figs. 2, 7 and 8. The lid 26 is adapted to be seated upon the superstructure 54 to close the opening at the top thereof. The bottom 56 of the superstructure is centrally perforated to detachably receive a container 57, preferably constructed of enameled metal, glass or similar non-corrosive material adapted to be heated and sterilized. The container 57 is preferably provided with an annular offset or ledge 40 which seats upon the bottom of the superstructure and holds the bottom of the container 57 out of contact with the bottom of the container 17. The container 57 is provided with a lid 58 and preferably with a spoon or dipper 59 by means of which the contents of container 57 may be stirred and also removed therefrom without contamination. The lower portion of the container 57 is submerged in the fluid of container 17. The bottom of the superstructure 54 is also preferably provided with perforations 60 to receive and support a series of containers 50 by which the fluid of container 17 may be held below room temperature when required.

In practice employing either the test tubes as shown in Fig. 6 or the incubating apparatus as shown in Fig. 7, the water or other fluid may be drawn off from the container 17 through the cock 30 until no more will flow from cock 30, and only a relatively small volume of fluid remains in container 17 below the level of the cock 30. Any type of burner may be inserted in chamber 19 so as to heat the small volume of fluid remaining in container 17 to boiling point, to thoroughly steam sterilize the utensils and also the culture medium in container 57, with the lid 26 in place so as to confine the heated vapors within the container 17 or within the container and superstructure. After the utensils and culture medium have been heated a sufficient length of time to sterilize them, cock 30 is closed and cool water is admitted through the conduit 38 and the overflow conduit 35 is adjusted endwise to cause an automatic overflow at the desired fluid height in the container 17 and the culture medium reduced to the desired incubating temperature and then inoculated with the culture to be propagated. If a temperature within the container 17 is to be maintained above the room temperature, then the thermostat key 49 is set to maintain the temperature desired which closes the circuit and lights up the incandescent bulbs thereby, heating the fluid in container 17 until the desired temperature is reached, whereupon the thermostat alternately opens and closes the circuit to maintain, within one or two degrees, a uniform temperature in container 17 and above the temperature of the room. Either the test tube racks may be immersed in the fluid of the container 17, or the superstructure 54 and incubating container 57 adjusted to position upon the container 17, as may be desired.

In the event that a uniform temperature below the room temperature is desired to be maintained within the container 17, means is employed to cool or refrigerate the fluid in container 17 to a temperature a few degrees or slightly below that which it is desired to maintain therein, and the key 49 of the thermostat is then adjusted to maintain the fluid in container 17 at the predetermined temperature by alternately opening and closing the electrical circuit through the incandescent bulbs. This cooling or refrigerating effect upon the fluid in container 17 may be attained by several instrumentalities, depending upon which is most conveniently available, and the amount of reduction below the room temperature required. For instance if the temperature is only required to be reduced a few degrees below the room temperature and the temperature of the water supplied through conduit 38 is sufficiently below the room temperature, a continuous flow of small volume through conduit 38 will serve to cool the body of fluid within the container 17 to a point below the temperature required therein, and the thermostat will serve to automatically and intermittently apply heat to maintain the body of fluid in container 17 at the desired temperature. Where the temperature desired to be maintained in container 17 is considerably below that of the room temperature a coil 48 through which refrigerated brine from an artificial refrigerating machine is preferably employed to refrigerate the fluid contents of container 17 to the desired extent, the amount of such refrigeration being controlled and regulated by means of a valve 47 employed to circulate more or less cold brine as may be desired. Where cold brine from an artificial refrigerating machine is not available one or more of the small containers 50 is filled with crushed ice or with other freezing mixture and said container or containers partly submerged in the fluid of container 17 to refrigerate the fluid of container 17 to the desired extent below the room temperature, while the thermostat and heating element 43 are relied upon to intermittently supply heat as may be required to maintain the fluid of container 17 uniformly at the pre-determined temperature. I am thus enabled to employ my improved apparatus reliably with test tubes and with incubating containers, and to conveniently secure temperatures either above or below the room temperature, and to adjust and retain the temperature uniformly at any pre-determined point that may be best adapted for either testing or incubating operations. The use of an incubating container having a lid 58 prevents the introduction of moisture into the culture; prevents the introduction of foreign bacteria into the culture while the culture is being agitated, and enables the culture to be periodically agitated. It also enables the culture to be removed from the incubator and transferred with its lid or lids in place to a refrigerator or storage room without liability of introducing foreign bacteria.

The apparatus herein disclosed is capable of considerable modification within the scope of the claims, without departing from the spirit of my invention.

What I claim is:

1. A bacteriological incubator comprising a container having a liquid bath in which to immerse an incubating vessel, an incubating vessel, a heating member adapted to intermittently heat said liquid bath, a thermostat actuated by changes in temperature of said liquid bath to intermittently stop and start the operation of said heating member, and a continuously acting refrigerating member adapted to continuously hold the temperature of said bath below the room temperature while being intermittently acted upon by said heating member.

2. A bacteriological incubator comprising a container for a liquid bath, having a lid giving access thereto, an electrical circuit, an electrical heating member included in said circuit and adapted to intermittently heat said bath, a thermostat partly immersed in said bath and serving to open and close said electrical circuit, a member controllable to refrigerate said bath approximately to pre-determine temperatures lower than the room temperature, and an incubating vessel located in said container and partly immersed in said bath.

3. A bacteriological incubator comprising a container for a liquid bath having a lid giving access thereto, an electrical circuit, an electrical heating member included in said circuit and adapted to intermittently heat said bath, a thermostat partly immersed in said bath and serving to open and close said electrical circuit, means adjustable to pre-determine the temperature limits at which said thermostat will open and close said electrical circuit, a member controllable to cool said bath approximately to pre-determined temperatures lower than the room temperature, and an incubating vessel located in said container and partly immersed in said bath.

4. A bacteriological incubator comprising a container for a liquid bath, a superstructure supported upon and constituting a lid for said container and a support for an incubator member to be partially immersed in the liquid bath of said container, a lid for said superstructure, an electrical circuit, an electrical heater member included in said circuit and adapted to intermittently heat said bath, a thermostat partly immersed in said bath and serving to open and close said circuit, and a member controllable to cool said bath approximately to predetermined temperatures lower than the room temperature.

In testimony whereof I have affixed my signature.

VALDEMAR CHRISTENSEN.